G. W. GOSS.
TAX CALCULATING DEVICE.
APPLICATION FILED AUG. 26, 1910.
1,024,071.
Patented Apr. 23, 1912.
3 SHEETS—SHEET 1.
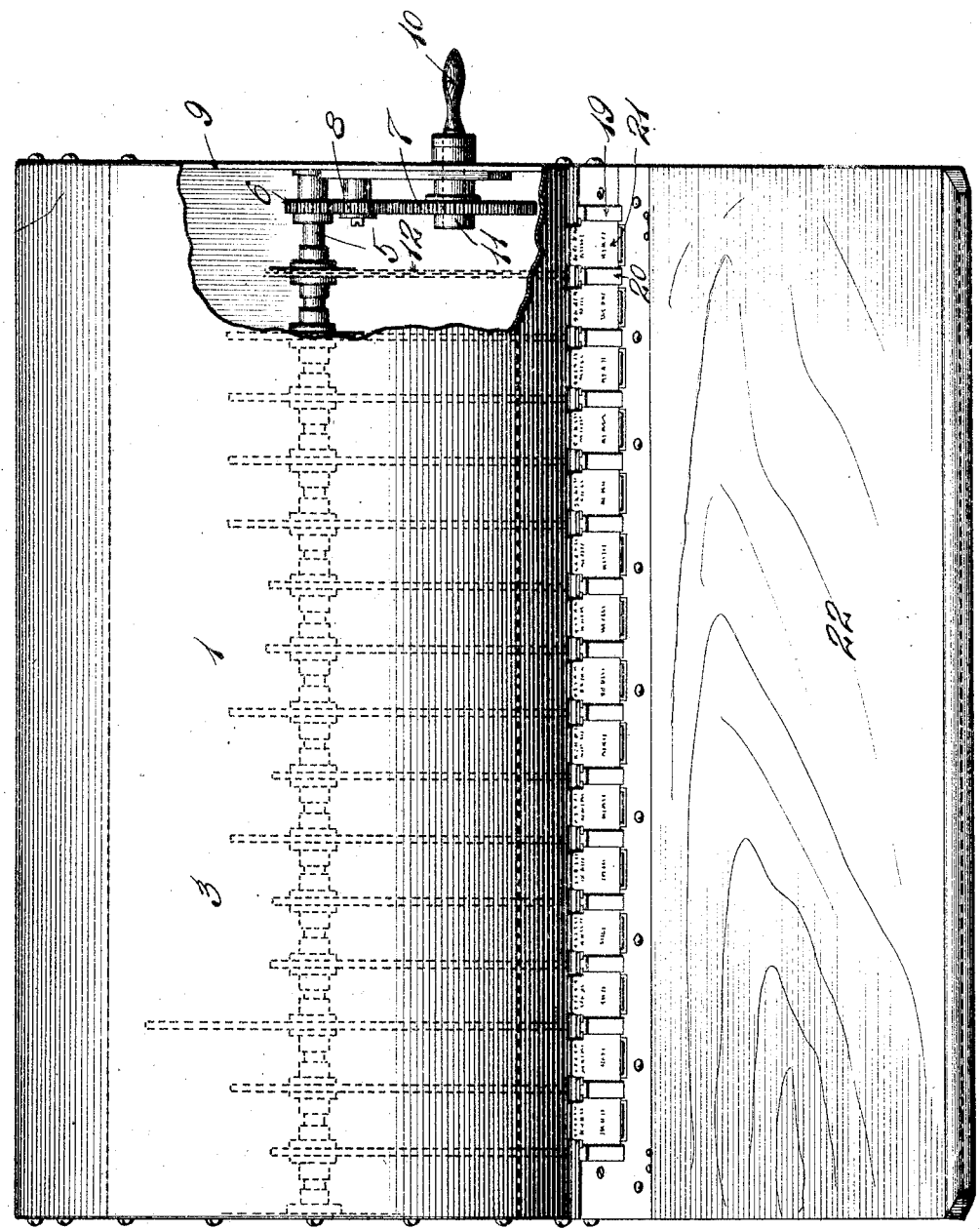
WITNESSES.
E. W. Harrington.
Wm. James.
INVENTOR.
George W. Goss.
By F. R. Cornwall Atty.

G. W. GOSS.
TAX CALCULATING DEVICE.
APPLICATION FILED AUG. 26, 1910.
1,024,071.
Patented Apr. 23, 1912.
3 SHEETS—SHEET 2.
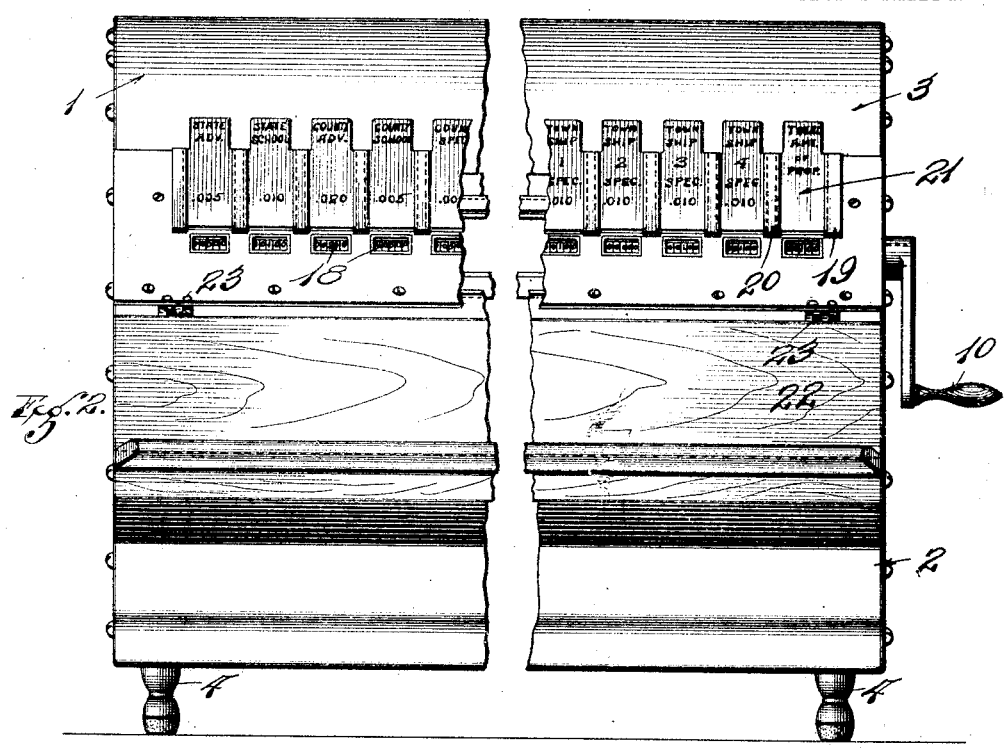
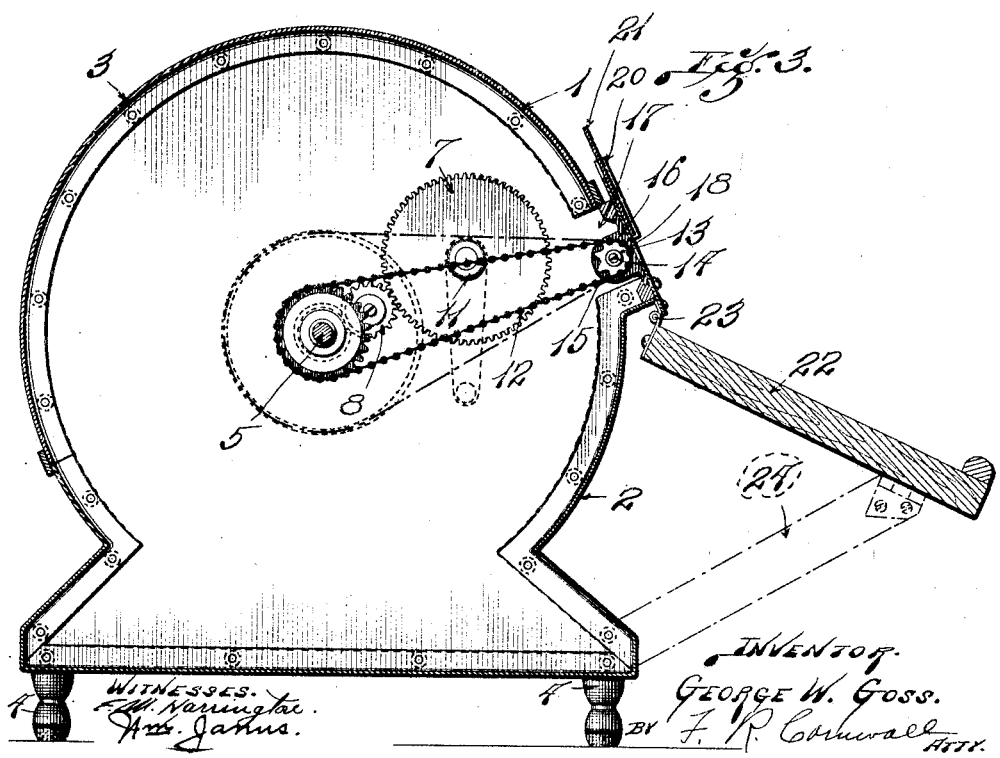

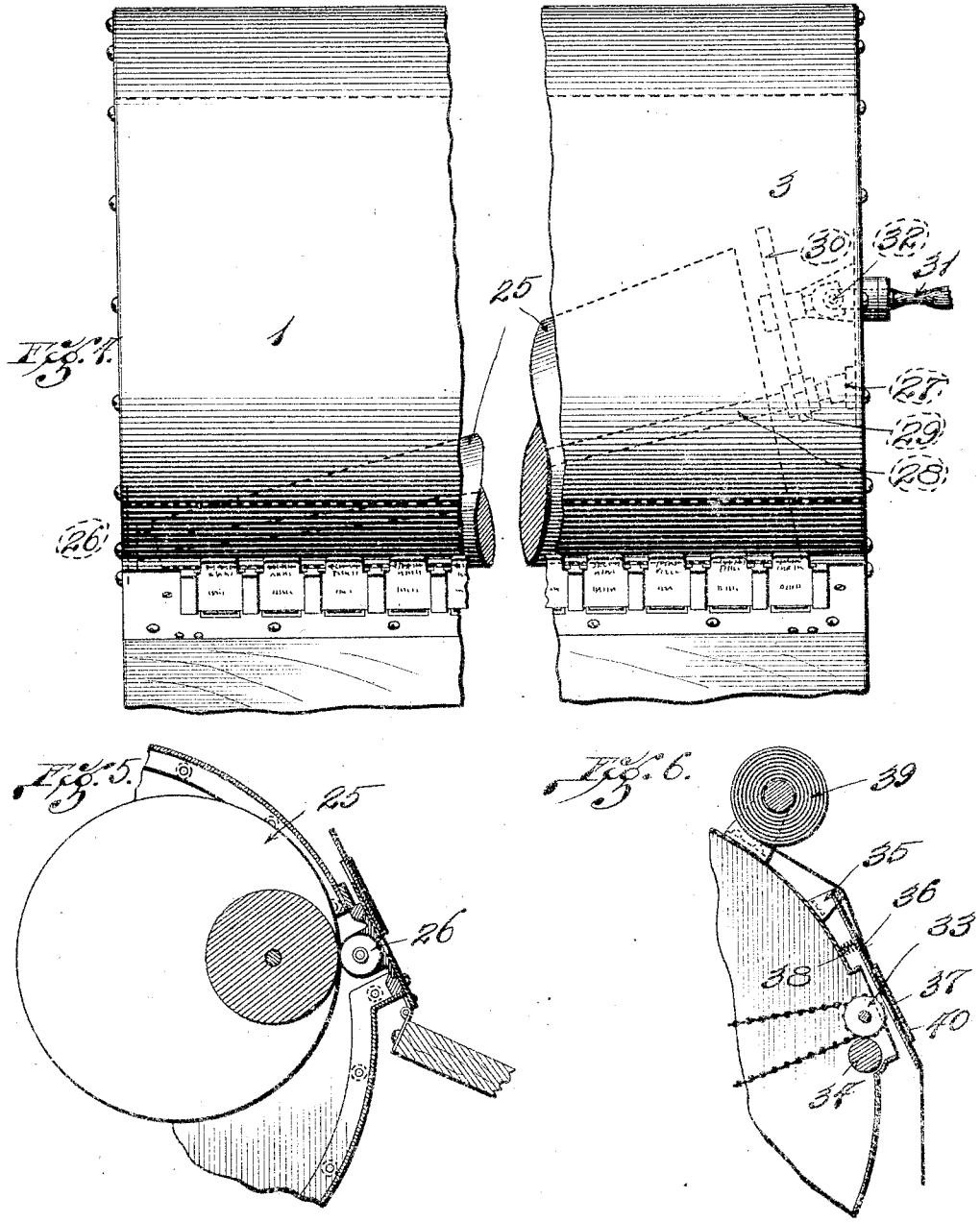

UNITED STATES PATENT OFFICE.

GEORGE W. GOSS, OF ORLA, TEXAS, ASSIGNOR TO GOSS-ACREY CALCULATOR COMPANY, OF ST. LOUIS, MISSOURI, A CORPORATION OF MISSOURI.

TAX-CALCULATING DEVICE.

1,024,071.  Specification of Letters Patent.  Patented Apr. 23, 1912.

Application filed August 26, 1910. Serial No. 579,072.

*To all whom it may concern:*

Be it known that I, GEORGE W. GOSS, a citizen of the United States, residing at Orla, Texas, have invented a certain new and useful Improvement in Tax-Calculating Devices, of which the following is a full, clear, and exact description, such as will enable others skilled in the art to which it appertains to make and use the same, reference being had to the accompanying drawings, forming part of this specification, in which—

Figure 1 is a general plan view of my device partly broken away to illustrate certain features of construction. Fig. 2 is a view in side elevation. Fig. 3 is a transverse sectional view. Fig. 4 is a view similar to Fig. 1 showing a modification. Fig. 5 is a sectional view of the modification shown in Fig. 4. Fig. 6 is a second modification of my device.

My invention relates to an improvement in a tax calculating machine.

The object of my invention is to provide a simple and efficient mechanism for readily and accurately recording the various taxes, which it is necessary for a tax collector to calculate.

It is clear that knowing the tax valuation of a person's property, it is only necessary to ascertain whatever proportion of the valuation the law requires should be devoted to the different taxes in the State or county, in order to calculate said distinct taxes. For example, if the State school tax is one mill on the dollar it would be necessary to take one-thousandth of the total tax valuation to derive the State school tax, and similarly in all the other taxes throughout the county and State.

My device is comprised of a series of indicating mechanisms which are so proportioned that when one mechanism indicates the total tax valuation other adjacent mechanisms will record the various proportional taxes, and it is only necessary to adjust one mechanism to have the other mechanisms automatically record the proper amounts.

My improvement therefore consists of means for indicating a principal number in one totalizer or counter and simultaneously obtaining different percentages of the principal number in the other registers or counters, and in connection with the principal number thus registered and the differential percentages thereof obtained in the several registers I may make records of said principal number and percentages for use in making up tax lists or other purposes. Thus differential percentages of a known principal can be determined at the time the principal is being introduced into its totalizer; likewise, an unknown principal may be determined from a known percentage, by operating the apparatus until the known percentage is indicated, whereupon its principal will also be indicated; and the number of operations of the handle may be likened to "rate" or "rate per-cent.," which can be determined if either a principal or percentage is known.

Referring to the drawings, 1 indicates generally the outside sheet iron casing for the mechanism, which is substantially tubular in form, and made in two parts, 2 a base and 3 a top member. The base 2 as shown in Fig. 3 is formed of a flat portion with legs 4 projecting therefrom. The top 3 is hinged or otherwise connected to the base as to be readily removed therefrom.

5 is a shaft extending through the entire casing from one inclosed end to the other, upon which is mounted a series of gears of various sizes as illustrated in Fig. 1. The end gear 6 is intermeshed with a gear 7 through an intermediate gear 8. Both gears 7 and 8 are journaled in the end portion 9 of the casing. A handle 10 projects from the spindle 11 upon which the gear 7 is mounted. The other gears on the shaft 5 are sprocket gears connected by means of chains 12 with corresponding sprockets 13 mounted on the spindles 14 of a series of indicators or counters 15.

The counters 15 are of ordinary construction having three or four counter wheels which are connected so that when an end wheel has made one revolution it operates the adjacent wheel to move it through a portion, as a tenth of a revolution, and similarly the adjacent wheel operates another wheel next to it. These counter wheels are mounted in a suitable bracket 16 attached in an opening 17 in the casing 1, and present the numbers on the periphery of said counting wheels in front of a suitable opening 18 in the casing. Projecting upward from the bracket 16 is a series of guide ways, as for example 19 and 20, between which a suitable card 21 may be passed to be held, said card indicating the special tax to be recorded at the opening below the card. These cards, counters and operating mechanism are duplicated as illustrated in the drawings, in order to indicate a large number of tax valuations. Projecting from one extremity of the opening 17 in the casing is a shelf 22 hinged at 23 to the casing 1. This shelf may be supported, if desired, in position by means of braces 24.

In the form shown in Fig. 4 I have provided a cone-shaped pulley 25 mounted in bearings 26 and 27 in the ends of the casing 1. The pulley is mounted on a spindle 28 which has a gear 29 connected thereto intermeshing with the gear 30, supported in a suitable bracket and connected in any suitable manner with a hand crank 31 on the outside of the casing, as by a universal joint 32. This pulley 25 bears against a series of friction pulleys 26 suitably connected with counters in a similar manner to the sprocket gears 15 in my preferred construction. These friction pulleys 26 are suitably beveled (not shown in the drawings) to avoid excessive side draft.

In Fig. 6 I have illustrated a modification of the mechanism shown in Figs. 1, 2 and 3, by providing means for printing the various tax valuations on a sheet. In this construction I provide my counters or indicators with printing type on the periphery as 33 which engage an inking roller 34 mounted in the casing. Pivoted on a bracket 35 on the casing is a suitable paper holder and guide 36 with an opening 37 therein opposite the printing wheels 33. A spring 38 normally tends to retain the plate 36 in its outward position. The paper is mounted on a roll 39 and extends downwardly over the plate 36 and between said plate, and an adjacent plate attached thereto, 40. By moving the plate 36 toward the printing wheel the number is recorded on the sheet.

It will be apparent that if the various sprocket wheels mounted on the shaft 5 are properly proportioned by rotating the handle 10 the first set of counters, for example, may be adjusted to indicate the total amount of the tax payer's property, and at the same time the other counters will be proportioned to indicate fractional amounts which record the various taxes as, for example, the school tax, the special tax, road tax, township tax, etc. It is only necessary, therefore, to adjust the counter for the total valuation in order to receive the information as to the other taxes desired.

In the form illustrated in Fig. 6 it is clear that these results may be further printed on a tax collector's sheet. I do not wish to limit my device to its use for calculating taxes, as it is equally useful in many other connections. For example, it could be used to ascertain the various percentages on a known principal.

I am aware that minor changes may be made in the construction, arrangement and combination of the various parts of my device without departing from the spirit of my invention, the scope of which is indicated in the accompanying claims.

I claim:

1. In an apparatus of the character described, the combination of a main operating shaft, a totalizer operated from said main shaft to indicate a principal number, a plurality of totalizers differentially operated from said main shaft for obtaining different percentages of the principal number registered in the first-mentioned totalizer, and means for making a record of said principal number and percentages.

2. In a device of the character described, a casing, having a portion of one wall broken away, a support plate attached to the casing across the opening formed therein, a series of counters mounted on said plate, a gear wheel connected to each counter, a shaft extending interiorly of the casing, a series of wheels of different sizes mounted on said shaft, sprocket chains connecting the wheels on the shaft with the corresponding wheels attached to the counters, a gear wheel mounted on said shaft adjacent the end wall of the casing, a coöperating gear wheel journaled within the end wall of the casing, and a handle positioned outside the casing and operatively connected to said latter wheel.

In testimony whereof I hereunto affix my signature in the presence of two witnesses, this 24th day of Aug., 1910.

GEORGE W. GOSS.

Witnesses:
 Jos. A. Michel,
 J. W. Clift.